United States Patent
Velu

(10) Patent No.: US 10,009,914 B2
(45) Date of Patent: Jun. 26, 2018

(54) BANDWIDTH THROTTLING BASED ON HOME OCCUPANCY

(71) Applicant: Google LLC, Mountain View, CA (US)

(72) Inventor: Kamesh Raj Velu, San Jose, CA (US)

(73) Assignee: Google LLC, Mountain View, CA (US)

( * ) Notice: Subject to any disclaimer, the term of this patent is extended or adjusted under 35 U.S.C. 154(b) by 227 days.

(21) Appl. No.: 14/808,800

(22) Filed: Jul. 24, 2015

(65) Prior Publication Data

US 2017/0026987 A1 Jan. 26, 2017

(51) Int. Cl.
*H04W 72/12* (2009.01)
*H04L 12/859* (2013.01)
*H04W 28/02* (2009.01)
*H04W 72/04* (2009.01)

(52) U.S. Cl.
CPC ..... *H04W 72/1242* (2013.01); *H04L 47/2475* (2013.01); *H04W 28/0215* (2013.01); *H04W 72/048* (2013.01)

(58) Field of Classification Search
None
See application file for complete search history.

(56) References Cited

U.S. PATENT DOCUMENTS

| 5,476,221 | A | 12/1995 | Seymour |
| 6,928,295 | B2 | 8/2005 | Olson et al. |
| 7,884,727 | B2 | 2/2011 | Tran |
| 8,258,654 | B2 | 9/2012 | Parsons |
| 8,627,127 | B2 | 1/2014 | Mucignat et al. |
| 8,655,400 | B2 | 2/2014 | Kadous et al. |
| 8,965,441 | B1 | 2/2015 | Narasimhan et al. |
| 2013/0227626 | A1* | 8/2013 | Howarter ........... H04N 21/2385 725/109 |
| 2014/0001977 | A1* | 1/2014 | Zacharchuk ........ H04L 12/2816 315/291 |
| 2014/0266669 | A1 | 9/2014 | Fadell et al. |

* cited by examiner

*Primary Examiner* — Kent Krueger
(74) *Attorney, Agent, or Firm* — Kilpatrick Townsend & Stockton LLP

(57) ABSTRACT

A system includes an electronic device that has communication circuitry configured to communicate with one or more other electronic devices on a wireless network in a structure. The electronic device includes a processor operatively coupled to a memory and configured to determine a status associated with occupants of the structure. The processor may determine a priority schedule based at least in part on the status. The priority schedule may be indicative of an amount of bandwidth allocated to each of the one or more other electronic devices. The processor may then cause data to be communicated by each of the one or more other electronic devices based at least in part on the priority schedule.

24 Claims, 4 Drawing Sheets

BANDWIDTH THROTTLING BASED ON HOME OCCUPANCY

BACKGROUND

This disclosure relates generally to wireless networks, and, more particularly, to prioritizing traffic from devices on a wireless network.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless networks are often used in an area, such as a home, business, or university, to allow users to access and deliver a wide variety of data communications in a wireless manner. For instance, many individuals set up WiFi, Bluetooth, Zigbee, or Zwave networks in their houses to access the Internet, make VoIP phone calls, send emails, download movies, or the like. Many electronic devices, such as personal computers, video-game consoles, smartphones, tablet computers, and digital audio players, can conveniently connect to and use wireless networks. Frequently, an electronic device, such as a wireless access point (e.g., home router) connects the wireless devices to an adjacent wired network. The access point acts as a network hub, relaying data between connected wireless devices in addition to wired devices, such as an ethernet hub or switch, thereby allowing wireless devices to communicate. The wireless access point provides a great convenience by letting multiple electronic devices communicate nearly simultaneously. As technology continues to improve, more devices are connecting to wireless networks.

However, as network communication increases, the electronic device can only relay so much information in a given amount of time. Often, the data that is received first is relayed first, because the electronic device treats data from different devices equally. While the other devices are treated equally by the electronic device, the other devices are often not treated equally by occupants of the home. Further, individuals often treat devices differently depending on the circumstances. That is, what is most important to home occupants can often depend on where the occupant is located and what the occupant is doing.

When multiple devices compete to communicate on a network, the user experience (e.g., watching movies, playing games, or streaming music) can suffer (e.g., longer loading screens, latency, or slow loading bars) because of the limited information relayed in a given time. For example, if an occupant at home is watching a streaming movie and another occupant is downloading files from the Internet, the wireless access point communicates information to both devices. Because the wireless access point can only relay so much information at a time, the streaming movie may get delayed with a slower loading bar or a lower quality of movie. Further, if the occupants leave the house and forget to shut off the streaming movie, the download may run slow because the wireless access point is still streaming the movie. Similarly, if everyone is asleep and someone leaves the streaming movie running, a large file download may not be finished by morning.

As shown in the examples above, the electronic device does not take into account reasons for prioritizing wireless usage. Referring to the example above, the streaming movie and the downloading file both compete for available bandwidth, and the access point treats movie data equal to download data. As a result, the occupants watching the movie suffer because the wireless network fails to account for reasons (e.g., where the occupant is located, what the occupant is doing, how the occupant is interacting with the network) to prioritize wireless traffic. For the foregoing reasons, a need exists for a system and method that prioritizes traffic when there is reason to do so.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure is directed to a system and method that addresses the need to prioritize traffic when there is reason to do so. Reasons to prioritize traffic may include home occupancy, time of day, types of electronic devices, or other circumstances of the environment. In an embodiment, a processor of an electronic device may determine a status associated with occupants of the structure. The processor may prioritize traffic based on the status received. The processor may cause data to be communicated in an order based on the prioritized traffic.

For example, the processor may generate a prioritization schedule to prioritize the traffic associated with one or more electronic devices. One prioritization schedule may be used when the occupants are home, and a different prioritization schedule may be used when the occupants are not home. For instance, if occupants are home, a first prioritization schedule may have data for a television that is streaming a movie with a higher priority than a download on a computer, and a second priority schedule may have the download on the computer with a higher priority than the streaming movie when the occupants are not home. In some embodiments, the electronic device may be a wireless access point, thermostat, camera, hazard detector, sensor, door lock, doorbell, garage door, wristband, watch, fan, desktop, laptop, tablet, light bulb, light switch, outlet, refrigerator, stove, microwave, dishwasher, washer, dryer, stereo, intercom, sprinklers, pool heater, security system, appliance, or other electronic device suitable for wireless communication. The traffic of the one or more other electronic devices may be prioritized based on a type of the one or more other electronic devices communicating with the electronic device. For example, the wireless access point may prioritize time-sensitive data for a television over time-insensitive data for a download on a computer. The electronic device may also prioritize traffic based on time of day for people to improve user experiences when watching television at night.

By prioritizing wireless traffic, quality of service may be improved. Because the system and method account for user activity, the user experience is improved overall. Further, bandwidth priority more closely corresponds to priority assigned by users to devices. Additionally, by prioritizing wireless traffic, it can result in shorter load times, faster load progress bars, improved quality, less latency, and quicker downloads.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

I. Wireless Home Network

Figure 1:
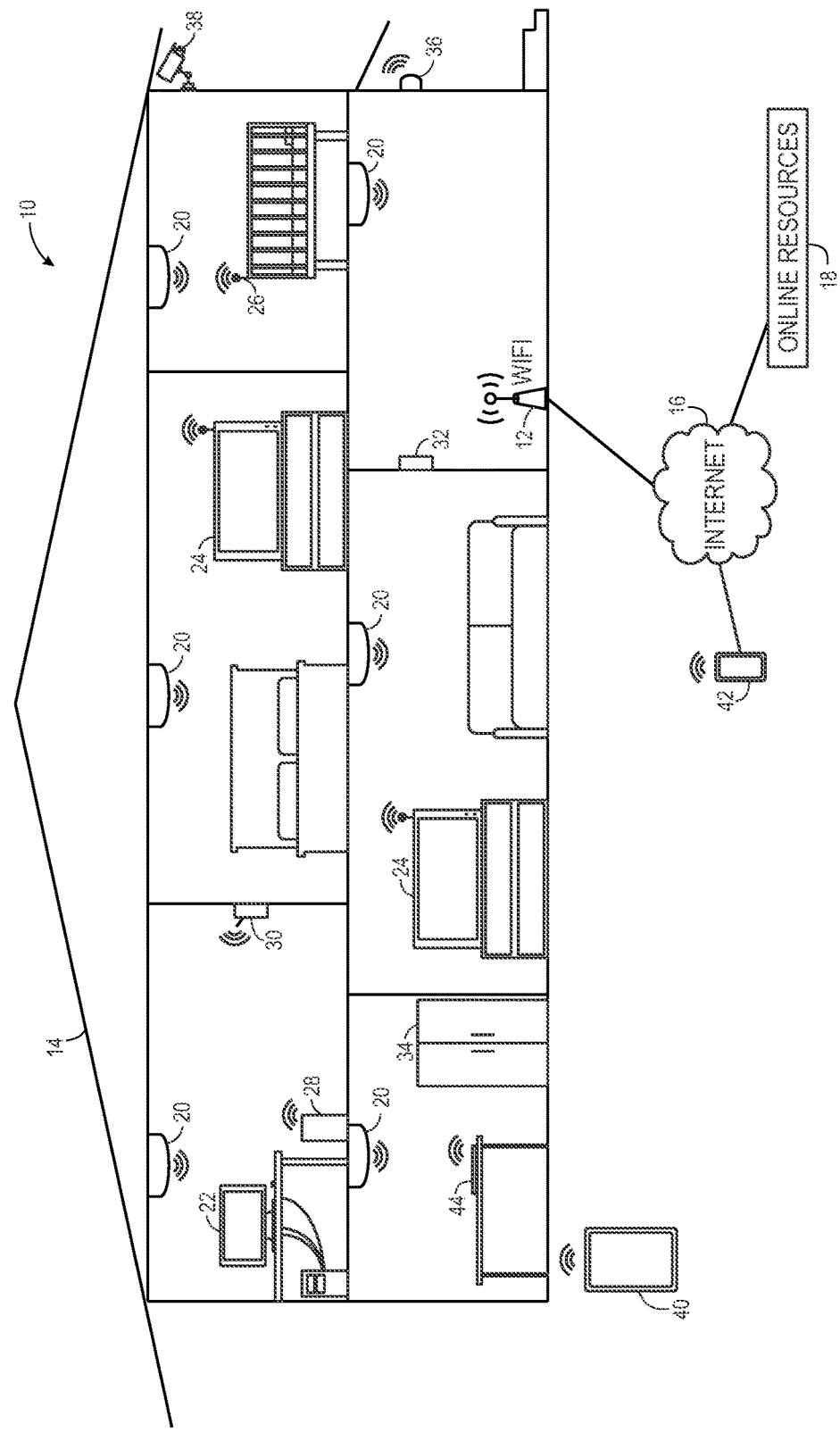
FIG. 1 illustrates a block diagram of a home environment in which an electronic device may communicate with one or more other electronic devices on a wireless network, in accordance with an embodiment of the present disclosure.

Reasons for prioritizing traffic can be gleaned from a closer look at the network environment. By way of introduction, FIG. 1 illustrates a home environment 10 with one or more wireless access points 12. The home environment 10 may include a structure 14 such as a house, office building, garage, or mobile home. It will be appreciated that devices can also be integrated into other types of home environments 10 that does not include an entire structure, such as an apartment, condominium, office space, or the like. The wireless access point 12 may be a WiFi router connected directly to a wired Ethernet connection in the structure 14 of the home environment 10. As such, the electronic devices may relay data packets (using radio waves) to the wireless access point 12, using one or more logical networks (e.g., WiFi), to act as a hub for communicating with the Internet 16 using the wired Ethernet connection. The wireless access point 12 may receive and/or transmit information between the electronic devices and an online resource 18 (e.g., cloud service, server, or database) on the Internet 16. The online resources 18 may be associated with a manufacturer, support entity or service provider associated with a particular device.

The home environment 10 may include a wide variety of electronic devices located within the structure 14. For instance, sensors 20 may be placed throughout the structure 14 of the home environment 10. The sensors 20 may be motion sensors, infrared sensors, smoke alarm sensors, carbon monoxide sensors, or the like. The home environment 10 may include a computer 22 that allows a user to access email, browse the web, download music, or perform other functions. Often, a home environment 10 may include one or more televisions 24. Further, the home environment 10 may include a camera 26, which may be standalone or part of a security system for inside the home. For instance, the camera 26 may be located by a baby (e.g., baby monitor) so the parents can monitor the baby from anywhere in their house. The home environment 10 may include a network-attached storage 28 (NAS) used to store files from the camera 26, the computer 22, or the televisions 24. The home environment 10 may also include at least one light switch 30 that may detect ambient lighting conditions, detect room-occupancy states, and control a power and/or dim state of one or more lights. Additionally, the light switches 30 may control a power state or speed of a fan, such as a ceiling fan. The home environment may also include a security system 32 that detects motion or glass breaks, and the security system 32 may send emergency signals to police or security provider via the wireless access point 12. The home could also have any number of smart appliances 34 that can communicate wirelessly, such as a dishwasher, oven, or refrigerator.

There may be several devices located outside of the structure 14 that are still a part of the home environment 10. The home environment 10 may have an entry interface device 36, such as a "smart doorbell", that can detect a person's approach to or departure from a location, control audible functionality, announce a person's approach or departure via audio or visual means, or control settings on a security system (e.g., to activate or deactivate the security system). The home environment 10 may also include at least one security camera 38 on or around the exterior of the structure 14. The security camera 38 may communicate with the wireless access point 12 via WiFi while being on the exterior of the structure 14.

In addition to devices located on the interior or exterior of the home, there may be devices that can be easily transported throughout the home environment 10. For instance, a tablet 40 may be used by a swimming pool and still be within range of the wireless access point 12 while outside of the structure 14. Smartphones 42 of the occupants may communicate with the wireless access point 12 outside or inside the structure 14, or the smartphones 42 may connect to another wireless network, such as a cell network. Further, the smartphones 42 may be used to communicate with electronic devices connected to the wireless access point 12. For instance, the smartphones 42 may show video and/or photographs from the camera 26. Additionally, a user may control electronic devices, such as the light switches 30 or the security system 32, with the smart phone 42 in the house. The home environment 14 may also include a thermostat 44, such as a Nest thermostat. One or more of the electronic devices, such as the thermostat 44, may be used to identify reasons to prioritize wireless traffic.

II. Interacting with the Wireless Home Network

The system and method described below has the advantage of prioritizing wireless traffic. There are many advantages to prioritizing traffic when there are reasons to do so. By prioritizing traffic, occupants waste less time waiting for the data that is important to them. This may be beneficial for many reasons, such a shorter load times, faster load progress bars, improved quality, less latency, and quicker downloads.

Because priorities of occupants change, prioritizing wireless traffic to better align with occupant priorities can depend on the circumstances. As a result, there can be a variety of reasons to prioritize traffic, and the reasons can change. For instance, priorities of occupants in the home environment 10 often depend on where occupants are located, what are occupants doing, and how the occupants are interacting with the network. The electronic devices of the home environment 10 may be used to detect various reasons (e.g., occupant location, activity, interactions, or time of day) for prioritizing traffic. In other words, how important devices are to occupants can be obtained from how occupants interact with their environment 10. For instance, if an occupant is at home streaming a movie on the television 24, the occupant may place more importance (i.e., a higher priority) on data for the television 24 than on data on the NAS 28 backing up files quickly. As a further example, the occupant may place a higher priority on a download on the computer 22 or the NAS 28 when the occupant is asleep.

Figure 2:
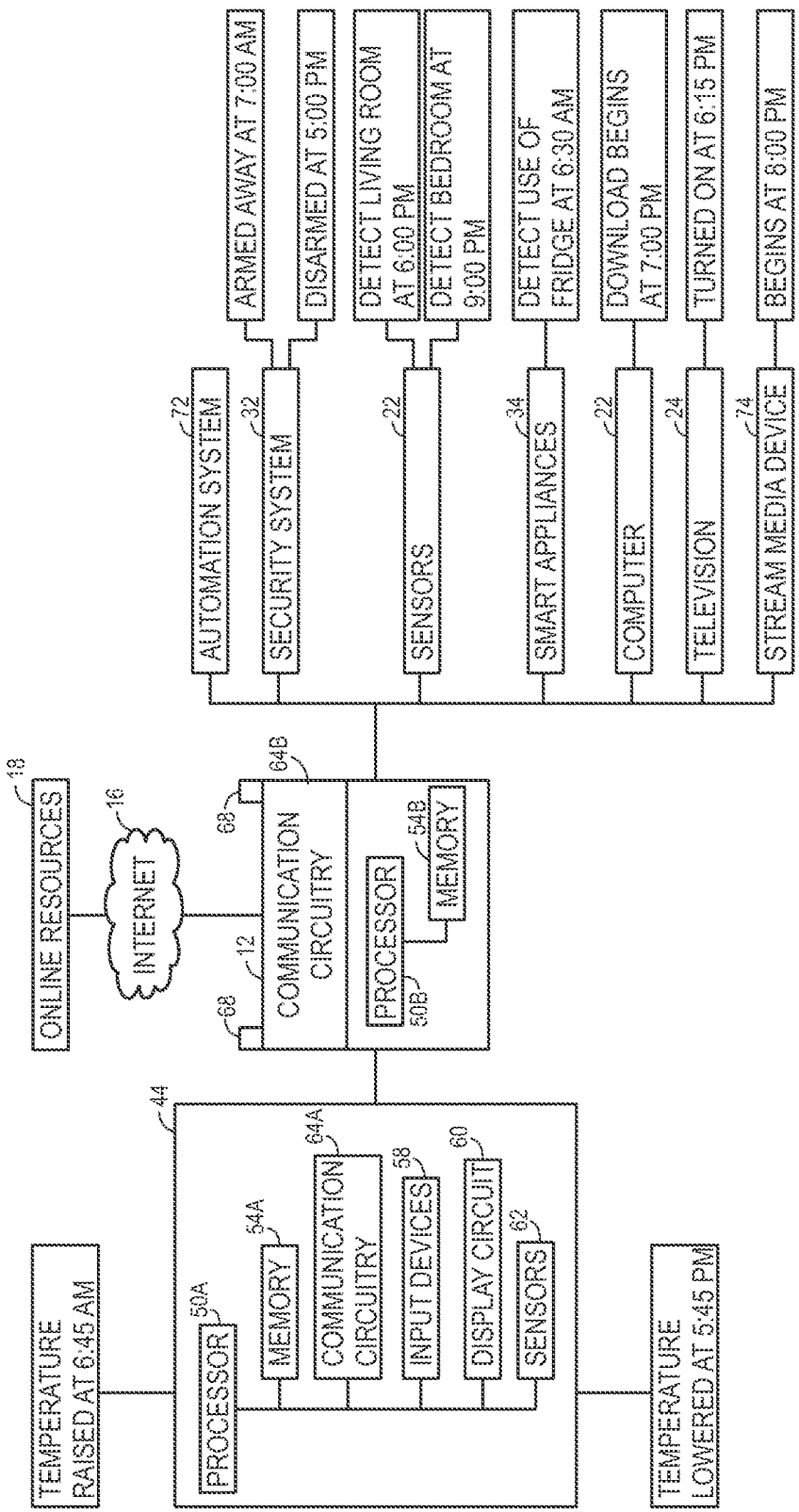
FIG. 2 illustrates a block diagram of occupants interacting with electronic devices on the wireless network in the home environment of FIG. 1, in accordance with an embodiment of the present disclosure.

Occupant location, activity, time of day, or other reasons to prioritize traffic, can be obtained from interactions with the environment 10, such as the thermostat 44. FIG. 2 shows interactions between the occupant, devices, and the wireless access point 12. While a thermostat 44 is described herein, it is merely an example. Any electronic device suitable for determining whether a reason exists for prioritizing traffic may be used, such as a smoke alarm, security system 32, sensors 20, or the computer 22.

The electronic devices, such as the wireless access point 12, the thermostat 44, the camera, the sensors 20, and the entry interface device 36, may have one or more processors 50 (e.g., thermostat processor 50A and/or wireless access point processor 50B) operatively coupled to memory 54 (e.g., thermostat memory 54A and/or wireless access point memory 54B). The one or more processors 50 may be configured to execute instructions (e.g., software or firmware) encoded in programs and stored in a tangible, non-transitory computer readable medium (e.g., the memory 54) to perform the processes described with respect to FIGS. 3-7 below. The processors may be general purpose processors, system-on-chip (SoC) devices, or application specific integrated circuits, or some other processor configuration. The memory 54 may include a computer readable medium, such as, without limitation, a hard disk drive, a solid state drive, a diskette, a flash drive, a compact disc, a digital video disc, random access memory (RAM), and/or any suitable storage device that enables the processor(s) to store, retrieve, and/or execute instructions and/or data.

The processor 50A of the thermostat 44 may control operation of the thermostat 44 and generally manage the temperature of the structure 14 according to the preferences of the occupant. The illustrated embodiment of the thermostat 44 also includes input devices 58 (e.g., knobs, wheels, touchscreens) to enable a user to directly interface with the thermostat 44 to provide occupant temperature preferences. The illustrated thermostat 44 also includes display circuitry 60 capable of presenting a graphical user interface (GUI) to display information to the user. Further, the illustrated thermostat 44 also includes a number of sensors 62. For example, the sensors 62 may include one or more of the temperature sensing devices, acoustic sensing devices, visible or IR sensing devices, vibration sensing devices, air pressure sensing devices, or EMI sensing devices discussed above.

One or more of the electronic devices may include communication circuitry 64 (e.g., the thermostat communication circuitry 64A and/or the wireless access point communication circuitry 64B) to communicate with other electronic devices. The communication circuitry 64 may include one or more antennas 74 that allow electronic device to communicate (e.g., via WiFi, 802.15.1, 802.15.4, Zigbee, Bluetooth, or Zwave) with the one or more other electronic devices in the network using, for instance, radio waves. The communication circuitry may include IEEE 802.xx (e.g., 802.11 a/b/g/n/ac), 802.15.1, 802.15.4, or Zwave standards, Ethernet, power-line networks, or other suitable networks to communicatively couple the electronic device with other electronic devices. The network may utilize an IPv4 and/or IPv6 transport protocol when communicating data between electronic devices. In some embodiments, the communication may include using transmission control protocol (TCP) and/or user datagram protocol. Further, the communication circuitry of one or more electronic device may be configured to join a fabric network (e.g., wireless mesh network). For example, the wireless mesh network may communicate as set forth according to the techniques disclosed by U.S. patent application Ser. No. 13/926,335, entitled "Efficient Communication for Devices of a Home Network" and filed on Jun. 25, 2013, which is incorporated by reference herein in its entirety. One or more electronic device may communicate via another electronic device to provide signals that are utilized by the wireless access point 12, thermostat 44, or other suitable electronic device. The wireless access point communication circuitry 64B may include a wired connection that enables the wireless access point 12 and other electronic devices to communicate with online resources 18 through the internet 16. One or more of the electronic devices may be used to detect various reasons to prioritize network traffic.

III. Reasons for Prioritizing Traffic (Occupant Location and Activity)

One reason to prioritize network traffic may be to better address occupant wireless network needs. If network traffic priorities are better aligned with occupant priorities, then occupant needs are better addressed. Devices that occupants find most important can often depend on who the occupant is, where occupants are located, what occupants are doing, and how occupants are interacting with the network. As such, reasons to prioritize network traffic often depend on occupant identity, location, activity, and interaction. Accordingly, some of the reasons to prioritize traffic may include home occupancy and/or room occupancy, time of day, types of electronic devices, or other circumstances of the environment.

One or more of the electronic devices may be used to detect occupant locations, such as home occupancy and/or room occupancy. For instance, home occupancy and/or room occupancy may be detected based on network activity, sensor activity, smart appliances, GPS tracking, shared scheduling, or any other suitable means. The processor 50A of the thermostat 44 may determine that certain devices are communicating on the communication network hosted by the wireless access point 12. For example, the sensors 20 may be able to detect network traffic being generated by the computer 22, smartphones 42, television 24, streaming media devices 74, or any other electronic device of the home environment 10, which may be used as a measure of occupancy and/or occupant activity to determine a probability of occupancy and/or an occupancy probability profile within the home environment 10 and/or portions of the structure 14. By specific example, a spike in network traffic by one or more of the devices listed above may indicate that an occupant is actively using the device (e.g., television 24) that may be associated with a particular portion of the structure 14 (e.g., sensors 20 in the living room or den). By further example, the thermostat 44 may receive information regarding the current location (e.g., global positioning system (GPS) coordinates or cellular phone location coordinates) of the occupant from one or more electronic devices (e.g., the smartphones 42 or the computer 22), which may be used to determine activity of the occupant. Accordingly, an electronic device, such as the thermostat 44, may determine that the occupant is present or away from the home environment 10.

Based on the network traffic and/or sensor data, the processor 50A of the thermostat 44 may determine the occupancy (e.g., occupancy probability profile or probability of occupancy) of a room. The sensors 20 or the camera 26 may detect movement, heat, or sound that indicate an occupant is in a specific room. Further, activity or network traffic of one or more devices may suggest that an occupant is in a room or perform an activity. For instance, if a television 24 is associated with a living room and network activity suggests that the television is active, the processor 50A may determine that occupants are in the living room. In some cases, the processor 50A may identify one or more of the occupants based on the activities performed by the occupants and prioritize data based on who the occupants are where the occupants are located. For example, if a television in the master bedroom or family room is active, the parents' use of the television can trump the use of a children's television, or a parents' use of a computer in their room may trump the children's television, because of the occupant's role or status in the structure.

Furthermore, being coupled to the communication network of the home environment 10 may also enable the thermostat 44 to interact with certain electronic devices to predict future occupancy and/or occupant activities in the home environment 10. For example, an occupant may enable the thermostat 44 to access occupant schedule information from one or more electronic devices 54. By specific example, an occupant may maintain an agenda or schedule on the computer 22, on the smartphones 42, or using an online resource 18, and the occupant may further grant the thermostat 44 access to the occupant's schedule on one or more of these devices or resources. Additionally and/or alternatively, the thermostat 44 may be able to access other occupant information from the computer 22, smartphones 42, and/or online resources 18, such as, for example, the occupant's e-mails, notes, instant messages, or to-do lists. By further example, the thermostat 44 may access one or more scheduled alarms of an alarm app or application of smartphones 42 to glean information useful in predicting when the occupant may wake the following day. To determine what occupants are doing and how occupants are interacting with the network, the processor 50A may determine the type of electronic device and/or time of day.

The type of data and/or type of electronic device may be found by using, for instance, the MAC address of the device. As an example, the camera may need wireless access to communicate information (e.g., video, photos, time of day, etc.). For instance, an electronic device may receive signals from the camera system indicating the MAC address or the type (e.g., make, model, serial number) of electronic device. In some cases, the electronic device (e.g., WiFi access point 12, thermostat 44, television 24) may obtain the MAC address or other type of electronic device information when a device is added to the network. If the thermostat 44 or the wireless access point 12 receives the MAC address, the processor 50 may use the MAC address to determine a manufacturer, vendor, or model of the electronic device. The type of electronic device may be associated with certain types of data. For instance, the television 24 may be typically associated with streaming movies or other media. The processor 50A of the thermostat 44 may determine what types of data are associated with the electronic device, or the thermostat 44 may interact with an online resource 18 to find types of data for devices. Moreover, one or more of the electronic devices may keep track of the current time of day. The time may be received from an online resource 18 or tracked on any device suitable for tracking time. When one or more of the processors 50 accesses signals related to occupant identity, location, time of day, type of electronic device and/or data, or other information about the environment 10, the processor 50 can prioritize traffic based on the signals.

IV. How Traffic is Prioritized

The electronic devices may utilize the features described above to detect reasons for prioritizing bandwidth by analyzing occupant interaction with the home environment 10. Being coupled to the communication network may enable the thermostat 44 to communicate with other electronic devices to determine if there is a reason to prioritize traffic based on the circumstances. For example, the thermostat 44 may receive information from automation systems 72 and/or security systems 32 to determine information that may be relevant to what occupants may prioritize. Further, if the security system is armed away at 7:00 A.M. and disarmed at 5:00 P.M., it is less likely that the occupants care about data streaming to the television 24 between 7:00 A.M. and 5:00 P.M. Also, the thermostat 44 may receive information from sensors 20 positioned throughout the structure 14, such as occupant detection in various rooms (e.g., living room at 6:00 P.M. or bedroom at 9:00 P.M.). One or more of the smart appliances 62 of the structure 14 may also be coupled to a wireless network, which may enable the thermostat 44 to determine information (e.g., modes of operation, operation schedules, access or usage schedules, maintenance schedules, and so forth) for these appliances. For instance, if a fridge is opened at 6:30 A.M., there is a good chance the occupant is making breakfast given that the security system is armed at 7:00 A.M. As the electronic device, such as the thermostat 44, receives more information about how occupants interact with the system, one or more of the processors 50 can better prioritize traffic based on the information received. As will be appreciated, if a movie is being played on the television 24 (e.g., streaming via WiFi) at 6:15 P.M., the occupants may prefer that the movie be given a higher priority than the NAS 28 backing up files. As other devices interact with the network, such as a computer download or a streaming media device 74, one or more of the processors 50 may adjust the priorities when there are reasons to do so.

Figure 3:
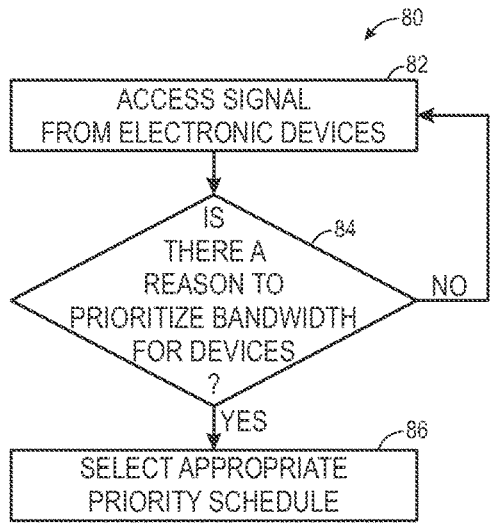
FIG. 3 illustrates a flow chart depicting a process, performed by a processor of the electronic device, of prioritizing bandwidth for devices on the wireless network, in accordance with an embodiment of the present disclosure.

One or more of the processors 50 may be configured to prioritize bandwidth on a wireless network. FIG. 3 is a flow chart of a process 80 for prioritizing traffic/bandwidth on an electronic device and causing prioritized traffic/bandwidth on the electronic device or one or more other electronic devices, such as the wireless access point 12, the thermostat 48, the camera 26, a hazard detector (e.g., one of the sensors 20), door lock 32, doorbell 30, garage door, wristband, watch, fan, desktop, laptop, tablet, light bulb, light switch 28, outlet, refrigerator, stove, microwave, dishwasher, washer, dryer, stereo, intercom, sprinklers, pool heater, security system, appliance, or any other electronic device suitable for wireless communication.

The process 80 may begin by the communication circuitry 64B of an electronic device receiving signals (e.g., data packets) from one or more other electronic devices on the wireless network that utilize bandwidth. The signals may be sent from the one or more other electronic devices on the network, such as the television 24, computer 22, or the like, to the electronic device. Alternatively and/or additionally, the signals may be sent from the one or more other electronic devices on the Internet 16, such as a server, a hub, a cloud service, or a switch, to the electronic device. The processor 50 of the electronic device may then access the signals received from the one or more other electronic devices (block 82). For example, the processor 50 may access a status associated with occupants of the structure. The processor 50 may continue by determining if there is a reason to prioritize bandwidth for devices (block 84). As mentioned above, there can be many reasons to prioritize network traffic, and the reasons often depend on occupant location, activity, and interaction. Prioritizing bandwidth may be desirable when a home is occupied/unoccupied, time of day, limited bandwidth, quality of service is suffering, different types of electronic devices, room occupancy, data rates are being monitored, environmental circumstances, or the like.

The processor 50 may then continue and include selecting the appropriate priority schedule (block 86). The electronic device may determine a priority schedule based at least in part on the status associated with occupants of the structure. Further, the priority schedule may be indicative of an amount of bandwidth allocated to each of the electronic devices. The priority schedule may be selected based on the reason bandwidth was prioritized (block 84). The processor 50 may cause data communicated from the electronic device to be communicated from the electronic device in an order based on the priority schedule. For example, the camera 26 may cause data to be communicated from the camera 26 in an order based at least in part on the priority schedule. As a further example, the door lock 32 may cause data to be communicated from the door lock 32 in an order based at least in part on the priority schedule. In other embodiments, the electronic device may cause data to be communicated from the one or more other electronic devices in an order based on the priority schedule. For example, a cell phone may be configured to cause data to be communicated from a camera in an order based at least in part on the priority schedule. Further, the electronic device (e.g., controlling device) may cause data of a second electronic device (e.g., controlled device) to prioritize data from the one or more other electronic devices based at least in part on the priority schedule. For example, a wristband may be configured to cause the camera 26 to prioritize data from the computer 22, tablet, and/or cell phone based on the priority schedule.

V. Priority Schedules

The processor 50 may utilize a variety of schedules depending on the electronic devices communicating on the wireless network and the particular settings found desirable. The following are merely examples, and any method suitable for prioritizing traffic may be used. Priority is used to determine which communication is more important (e.g., takes precedence or proceeds before) than others. For example, if the wireless access point 12 receives a first signal from a first electronic device (e.g., a computer download) and a second signal from a second electronic device (e.g., smartTV), the traffic was traditionally organized based on which signal was received first (e.g., FIFO). In the example, if the first signal arrives at the wireless access point 12 first, it is the first signal transmitted by the wireless access point 12. While the system is simple and fast, it may result in poor user experience because the data that is more important to the occupants can be sent at a less than optimal rate (e.g., the smartTV signal is sent slower than the computer download signal).

The traffic may be prioritized based on a priority queue. For instance, a wireless network utilizing a data structure, such as a priority queue, is illustrated in Table 1 below for illustration.

TABLE 1

| Example of a priority queue when house is occupied | | | |
|---|---|---|---|
| 1 | 2 | 2 | 4 |
| $TV_{LR}$ | $TV_{MBR}$ | $TV_{KIDS}$ | Download |

As illustrated in Table 1, the first row indicates a priority of the priority queue, and the second row indicates where data associated with an electronic devices is prioritized on the priority queue. The priority queue may be used, for instance, when the house is occupied. As shown in Table 1, three televisions 24 are using wireless communication, and the computer 22 is downloading a file. More specifically, the living room television (i.e. $TV_{LR}$) has the highest priority, the master bedroom television (i.e. $TV_{MBR}$) has the second highest priority, the kids television (i.e. $TV_{KIDS}$) is tied for the second highest priority, and the computer download (i.e. Download) has the fourth highest priority. In this example, an element with a high priority may be served before an element with a lower priority. As such, any traffic associated with the $TV_{LR}$ may be processed (e.g., transmitted to the appropriate device) first, because of the $TV_{LR}$ priority. The $TV_{MBR}$ and the $TV_{KIDS}$ would be processed based on the order in which data is received as they have similar priority levels. The Download would be processed last because it has the lowest priority level.

In this example, when an electronic device, such as the wireless access point 12, receives a Voice over IP (VoIP) phone call, the updated priority queue is illustrated in Table 2 below.

TABLE 2

Example of a priority queue with VoIP phone call

| 1 | 2 | 3 | 3 | 5 |
|---|---|---|---|---|
| VoIP | $TV_{LR}$ | $TV_{MBR}$ | $TV_{KIDS}$ | Download |

As illustrated in Table 2, the VoIP phone call may be the highest priority in the queue when data is communicated. Accordingly, one or more of the televisions 24 and the download would then be lower on the priority queue. The priority queue order may be based on how time sensitive the information is. With respect to Table 2, time sensitive information, such as VoIP, streaming media 74, or televisions 24, may be higher on the priority queue than time insensitive information, such as downloads, e-mail, or the like. Further, time critical information (e.g., information related to smoke alarms, security) may be higher on the priority queue than time sensitive and time insensitive information. However, when the home is no longer occupied, time sensitive information may be given less priority.

TABLE 3

Example of a priority queue when house is unoccupied

| 1 | 2 | 3 | 4 |
|---|---|---|---|
| Download | $TV_{LR}$ | $TV_{MBR}$ | $TV_{KIDS}$ |

When the home environment 10 is unoccupied, the processor 50 prioritizes the download as the highest priority. As illustrated in Table 3, the unoccupied priority may enable faster downloads while occupants are away if multiple TVs are running. In such cases, time critical information, such as security or smoke alarms, may still be given higher priority than both time sensitive information and time insensitive information.

The schedules may utilize classes or tiers of data depending on the type of electronic device and/or the type of data transmitted. For example, a priority schedule having classes of data is included in Table 4 below for an illustration.

TABLE 4

Priority schedule with classes

| Percent | Class | Electronic Device | Type of data |
|---|---|---|---|
| 75% | Class 1 | VoIP telephone | Phone calls |
| | | TV | Streaming media (Netflix) |
| 15% | Class 2 | NAS | Data storage |
| | | Camera | Uploading to cloud |
| 10% | Class 3 | Computer | Download files e-mail |

The priority schedule may utilize classes (e.g., Classes 1, 2, and 3) of electronic devices and/or types of data. As illustrated in Table 4, Class 1 of Table 4 includes a VoIP telephone for phone calls and a television using Netflix. As Class 1 may include time-sensitive electronic devices that utilize time-sensitive data, it may be preset or allocated to use a certain amount (e.g., 75%) of bandwidth. Further, Class 2 may involve data that is less time-sensitive than Class 1 and therefore given less priority. Accordingly, the NAS 28 for data storage and a camera may be allocated a lesser amount (15%) of bandwidth. Further still, Class 3 may involve data that is not time-sensitive and given the lowest priority, therefore receiving a lesser amount (10%) of bandwidth. The percentages may reflect the odds that the electronic device will transmit the next packet of information of that class. For instance, the odds that a class one packet will be sent next in a queue of traffic would be 3 out of every 4. This may be accomplished by randomization (e.g., checking if a random number between 1 and 100 falls between 1 and 75 for sending a class 1 packet, 76 and 90 for class 2 packets, etc.). Alternatively, the processor 50 may order the packets with a weighting system. While randomization and ordering are given as examples, any suitable method of prioritizing the classes and/or packets may be used.

A second schedule may be utilized by the processor 50 in order to prioritize traffic/bandwidth depending on the circumstances. For example, another priority schedule including classes of data is included in Table 4 below for an illustration.

TABLE 5

Second priority schedule with classes

| Percent | Class | Electronic Device | Type of data |
|---|---|---|---|
| 80% | Class 1 | VoIP telephone | Phone calls |
| | | Computer | Download files, email |
| | | NAS | Data storage |
| 15% | Class 2 | camera | Uploading to cloud |
| 5% | Class 3 | TV | Streaming media (Netflix) |

The second priority schedule with classes may include different percentages (e.g., 80%, 15%, and 5%) corresponding to different allocations of bandwidth than the first schedule. As illustrated in Table 5, Class 1 now includes the computer 22 and the NAS 28 for downloading files and data storage respectively. In the second priority schedule, Class 2 includes the camera and Class 3 includes the TV.

The traffic described above may be prioritized based on user occupancy at the home, the electronic device, and the type of data associated with that electronic device. As explained below, a first schedule may be used when the home is occupied (e.g., Table 1, 2, or 4), and a second schedule may be used when the home is unoccupied (e.g., Table 3 or 5). The time-sensitive data may be placed in a higher priority when home occupancy status indicates that the home is occupied. Further, time-critical information may be placed above time-sensitive information and/or time-insensitive information. For instance, if sensors indicate that smoke is in the home or the security system has been breached, time-critical information may be prioritized first.

VI. Prioritizing Based on Home Occupancy

Figure 4:
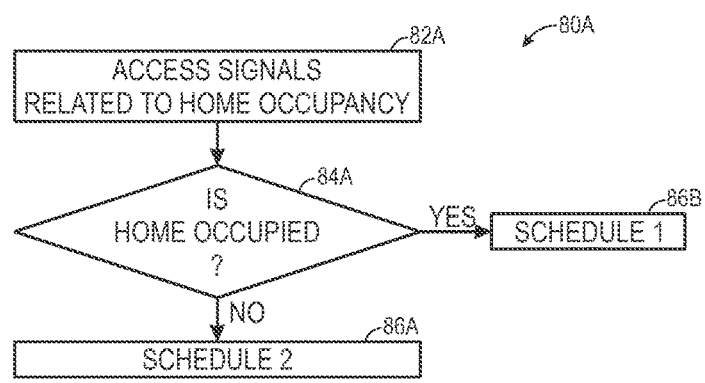
FIG. 4 illustrates a flow chart of an example of the process of FIG. 3 where prioritizing bandwidth is based on home occupancy status, in accordance with an embodiment of the present disclosure.

One or more of the processors 50 may prioritize wireless traffic (e.g., WiFi traffic) based on home occupancy. FIG. 4 shows a process 80A that is an example of FIG. 3 that uses home occupancy as the reason to prioritize bandwidth. The process 80A may begin by the communication circuitry 64 receiving signals related to home occupancy, such as signals indicating a status of the home (e.g., home occupancy status and/or home occupancy probability profile), a Boolean true/false value that indicates whether the home is occupied, or signals that may be used to determine home occupancy. The signals may be transmitted from the nest thermostat 44 of FIGS. 1 and 2, a smoke/carbon monoxide alarm, or any electronic device suitable for transmitting home occupancy related signals. Further, the signals may be accessed by the one or more processors 50 of the electronic device (block 82A).

The processor may utilize different priority schedules depending on the status of the home. The processor 50 may obtain signals that indicate whether the home is occupied (block 84A). The processor 50 may use a first schedule when the home is occupied (block 86B), such as schedules that place higher priority on time-sensitive information than time-insensitive information (e.g., Tables 1, 2, or 4). The first schedule may be prioritized based on quality of service desirable for when occupants are at home. The processor 50 may use a second schedule (block 86A) when the home is unoccupied. The second schedule may be prioritized based on quality of service desirable for when occupants are not at home. The processor 50 may use a second schedule that places higher priority of time-insensitive information than time-sensitive information (e.g., Tables 3 or 5). Accordingly, the first schedule may be used when the home is occupied, and the second schedule may be used when the home is unoccupied.

VII. Prioritizing Based on Time of Day

Figure 5:
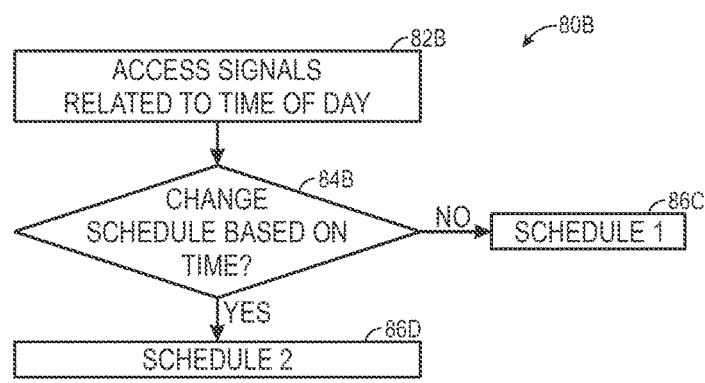
FIG. 5 illustrates a flow chart of another example of the process of FIG. 3 where prioritizing bandwidth is based on time of day, in accordance with another embodiment of the present disclosure.

Alternatively, the processor 50 of the thermostat 44 and/or the wireless access point 12 may be used to prioritize traffic based on time of day. FIG. 5 shows an example of a process 80B that prioritizes traffic within the home environment 10 based on time of day. The processor 50 may begin by checking the current time of day. The processor 50 may access signals related to the time of day (block 82B), such as from a clock of the access point 12 or from signals received from the thermostat 44 or another electronic device. The time of day may be a specific time or a time range (e.g., morning, afternoon, evening, night etc.). The processor 50 may then determine whether to change the schedule based on the time (block 84B). Specifically, this may involve comparing the current time with ranges associated with various schedules to determine the proper schedule. For instance, Schedule 1 may be associated with afternoon (e.g., 2 pm-5 pm), and Schedule 2 may be associated with evening (e.g., 5 pm-7 pm). The time may be compared to the afternoon range and/or the evening range. If the time is 4 p.m., then the processor 50 may continue and keep, for instance, Schedule 1 priorities as described above (block 86C). However, if the current time is in the evening, the processor 50 may change to Schedule 2 (block 86D). The processor 50 may check to change the schedule after a predetermined amount of time, such as each second, minute, or hour. Alternatively, the processor 50 may utilize interrupts that indicate time changes.

VIII. Prioritizing Based on Home Occupancy and Time of Day

Figure 6:
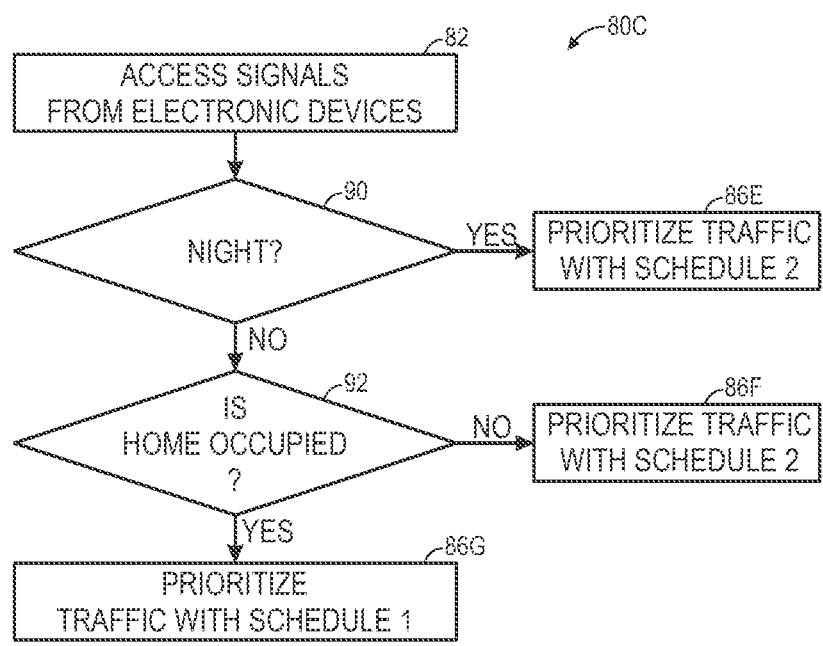
FIG. 6 illustrates a flow chart of yet another example of the process of FIG. 3 wherein prioritizing bandwidth is based on both time of day and home occupancy.

The processor 50 may use multiple reasons to prioritize bandwidth, such as determining priority based on both home occupancy and current time of day. FIG. 6 shows an example of a process 80C that performs the steps of FIG. 2 by utilizing both time of day and home occupancy to prioritize traffic of a wireless access point 12. The wireless access point 12 may begin by receiving signals from electronic devices of the wireless network, and the processor 50 then accesses the signals received (block 82). The signals are then prioritized based on the time of day and home occupancy. For instance, the processor 50 may determine if the current time is associated with night (block 90). If the time is associated (e.g., falls in a range of times) with night, traffic may then be prioritized with schedule 2 (block 86E). If the time is associated with day, the processor 50 may then base priorities on whether the home is occupied (block 92). If the home is not occupied, traffic may be prioritized with schedule 2 (block 86F). In this example, the traffic may be prioritized with schedule 2 when individuals are presumed to be asleep because it is night or when individuals are presumed to be away because of a low probability of occupancy. Conversely, if the time is not night and the home is occupied, traffic may then be prioritized with schedule 1 (block 86G).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A tangible, non-transitory computer-readable medium comprising instructions configured to be executed by a one or more computer processors associated with a structure, the instructions comprising instructions to:

determine a status of occupants of the structure, wherein the status is based on one or more occupants being present in the structure or that one or more occupants of the structure are asleep;

select a priority schedule from a plurality of priority schedules based at least in part on the status, wherein:

each priority schedule of the plurality of priority schedules is indicative of a relative priority of communications of each electronic device of a plurality of electronic devices in relation to each other; and the relative priority of the communications of each electronic device of the plurality of electronic devices in relation to each other is different based on the status; and cause a wireless access point to reorder and relay communications of the plurality of electronic devices based at least in part on the selected priority schedule.

2. The non-transitory, computer-readable medium of claim 1, wherein the priority schedule is based at least in part on device types of each of the electronic devices that are utilized to determine time sensitivity of the data sent by each of the electronic devices.

3. The non-transitory, computer-readable medium of claim 1, wherein the priority schedule comprises a first priority schedule that is configured to give a first priority related to streaming media and give a second priority related to downloading files, wherein the first priority is higher than the second priority when the status indicates that at least one of the occupants is in the structure.

4. The non-transitory, computer-readable medium of claim 3, wherein the second priority is higher than the first priority when the status indicates that there are no occupants in the structure or any occupants are asleep.

5. The non-transitory, computer-readable medium of claim 1, comprising a first priority schedule and a second priority schedule, wherein the first priority schedule is used when the status indicates that at least one of the occupants is in the structure, and wherein the second priority schedule is used when the status indicates that none of the occupants are in the structure.

6. The non-transitory, computer-readable medium of claim 1, the instructions comprising instructions to cause the data to be communicated in an order according to the priority schedule.

7. An electronic device, comprising:

communication circuitry configured to communicate with a plurality of electronic devices on a wireless network in a structure; and a processor operatively coupled to a memory, wherein the processor is configured to:

determine a status of occupants of the structure, wherein the status is based on one or more occupants being present in the structure or that one or more occupants of the structure are asleep;

select a priority schedule from a plurality of priority schedules based at least in part on the status, wherein: each priority schedule of the plurality of priority schedules is indicative of an amount of bandwidth allocated to each electronic device of a plurality of electronic devices;

cause data to be communicated by each of the plurality of electronic devices based at least in part on the priority schedule such that each electronic device of the plurality of electronic devices are allocated the amount of bandwidth indicated by the selected priority schedule.

8. The electronic device of claim 7, wherein the priority schedule is further based on a first schedule when the time of day falls within a first range, and wherein the priority schedule is based on a second schedule when the time of day falls within a second range.

9. The electronic device of claim 7, wherein the priority schedule is based on data from a first electronic device of the one or more other electronic devices likely being more time sensitive than a second electronic device of the one or more other electronic devices when the status indicates that occupants are in the structure.

10. The electronic device of claim 9, wherein the time sensitivity of data for each of the one or more other electronic devices is based on types of data most likely to be sent or received by the one or more other electronic devices.

11. The electronic device of claim 10, wherein the types of data most likely to be communicated is based on the types of the one or more other electronic devices determined by MAC addresses of the one or more other electronic devices.

12. The electronic device of claim 7, wherein the status is sent to the electronic device from a thermostat, a smoke alarm, a carbon monoxide alarm, a hazard detector, a sensor, a wristband, a watch, a computer, a door lock, a fan, a light bulb, or any combination thereof.

13. The electronic device of claim 7, wherein the priority schedule is based on providing more bandwidth for the one or more other electronic devices with traffic more likely to be stored in memory when no occupants are in the structure.

14. The electronic device of claim 7, wherein the processor of the electronic device is configured to cause data to be communicated from the electronic device in an order based at least in part on the priority schedule.

15. The electronic device of claim 7, wherein the electronic device comprises a camera, wherein the processor is configured to cause data to be communicated from the camera in an order based at least in part on the priority schedule.

16. The electronic device of claim 7, wherein the electronic device comprises a television, wherein the processor is configured to cause data to be communicated from the television in an order based at least in part on the priority schedule.

17. The electronic device of claim 7, wherein the electronic device comprises a cell phone, wherein the processor of the cell phone is configured to cause data to be communicated from a camera in an order based at least in part on the priority schedule.

18. The electronic device of claim 7, wherein the electronic device comprises a cloud service, wherein the processor of the cloud service is configured to cause data to be communicated from a computer in an order based at least in part on the priority schedule.

19. A method, comprising:
determine a status of occupants of a structure, wherein the status is based on one or more occupants being present in the structure or that one or more occupants of the structure are asleep;
select a priority schedule from a plurality of priority schedules based at least in part on the status, wherein:
each priority schedule of the plurality of priority schedules is indicative of a relative priority of communications of each electronic device of a plurality of electronic devices in relation to each other;
the relative priority of the communications of each electronic device of the plurality of electronic devices in relation to each other is different based on the status; and
cause a wireless access point to reorder and relay communications of the plurality of electronic devices based at least in part on the selected priority schedule.

20. The method of claim 19, wherein the priority is based on a first schedule when the structure is occupied, and wherein the priority is based on a second schedule when the structure is unoccupied.

21. The method of claim 19, wherein the relative priority of each of the electronic devices is based on a percentage of a total amount of bandwidth.

22. The method of claim 19, wherein the relative priority provided to one of the plurality of electronic devices is associated with a likelihood that the occupants are utilizing data of the one of the one or more electronic devices when the occupants are in the structure.

23. A method, comprising:
determining an occupancy status based on a likelihood that occupants are in a structure;
determining a sleep status based on a likelihood that any occupants of the structure are asleep;
selecting a priority schedule from a plurality of priority schedules based at least in part on the occupancy status and on the sleep status, wherein:
the priority schedule is indicative of an amount of bandwidth allocated to one or more electronic devices, and
the priority schedule comprises a first schedule when any occupants are asleep or no occupants are in the structure and a second schedule when occupants are in the structure and awake; and
cause a wireless access point to reorder and relay communications of the one or more electronic devices based at least in part on the selected priority schedule.

24. The method of claim 23, wherein the first schedule prioritizes traffic based on a likelihood that data is utilized by an occupant as it is received, and wherein the second schedule prioritizes traffic based on a likelihood that the data will be utilized when the occupants return to the structure.

* * * * *